US 6,718,104 B2

(12) United States Patent
Lowry (10) Patent No.: US 6,718,104 B2
(45) Date of Patent: Apr. 6, 2004

(54) TILED ELECTRO-OPTIC INTERACTIVE DISPLAY AND ILLUMINATION APPARATUS

(75) Inventor: Brian C. Lowry, Emlenton, PA (US)

(73) Assignee: MediaPull, Inc., Pittsburgh, PA (US)

( * ) Notice: Subject to any disclaimer, the term of this patent is extended or adjusted under 35 U.S.C. 154(b) by 0 days.

(21) Appl. No.: 10/171,208

(22) Filed: Jun. 12, 2002

(65) Prior Publication Data

US 2002/0186956 A1 Dec. 12, 2002

Related U.S. Application Data

(63) Continuation of application No. 09/718,744, filed on Nov. 22, 2000, now abandoned, which is a continuation-in-part of application No. 09/482,290, filed on Jan. 13, 2000, now Pat. No. 6,304,703.

(51) Int. Cl.[7] ................................................ G02B 6/04
(52) U.S. Cl. ....................................................... 385/120
(58) Field of Search ................................. 385/115, 901, 385/120, 121, 147, 1, 2, 42, 116; 40/546, 547; 345/32, 40, 41, 55; 359/451, 10, 11

(56) References Cited

U.S. PATENT DOCUMENTS 3,815,986 A * 6/1974 Darbee ........................ 385/901
6,304,703 B1   10/2001 Lowry

FOREIGN PATENT DOCUMENTS

FR            2789836     * 2/1999 .................. 385/115

OTHER PUBLICATIONS

U.S. patent application Ser. No. 09/718,744, Lowry.

* cited by examiner

Primary Examiner—Jean F. Duverne
(74) Attorney, Agent, or Firm—Pepper Hamilton LLP (57) ABSTRACT

An electro-optic video display apparatus consists of a plurality of optical fibers or light guides which convey a projected image from one or more projection surfaces to a larger display surface. The second surface is fashioned with additional optical circuits that transfer light and/or information incident upon the second surface to one or more third surfaces, for the purpose of detecting the proximity and/or motion of persons or objects near to the second surface.

21 Claims, 8 Drawing Sheets

Expanded View

Fig 1

Expanded View

TILED ELECTRO-OPTIC INTERACTIVE DISPLAY AND ILLUMINATION APPARATUS

CLAIM OF PRIORITY

This application is a continuation of, and claims priority to, U.S. patent application Ser. No. 09/718,744, filed Nov. 22, 2000, now abandoned which is a continuation-in-part of U.S. patent application Ser. No. 09/482,290, filed Jan. 13, 2000, now U.S. Pat. No. 6,304,703.

BACKGROUND

Not long after the advent of the personal computer, input devices were developed to supplement or replace the traditional keyboard. Such devices include mice, trackballs, light pens, tablets with styli, joysticks, and capacitive, touch-sensitive screens. While such devices are now commonplace and inexpensive for personal computers with relatively small screens, an analogous means of interaction for large screen video displays has not yet been developed. Indeed, given the limitations of most large screen technologies, the need for interaction has not previously arisen since most of these prior displays were not viewable in a proximity close enough to warrant interactively with the viewer(s).

The large screen display (LSD) industry is today dominated by light emitting diode (LED) and field emission display (FED) technologies which are limited by a minimum viewing distance of at least several meters. Obviously, it is impossible, at that distance, to physically interact with a display. Moreover, because LED and FED displays can only be viewed from distances greater than several meters, the problem does not exist.

However, there is a need in the marketplace for LSD's that are both proximally viewable and possess interactive capabilities. Moreover, such displays must be rugged, have a wide operating temperature range, and be visible in high ambient light. Such video displays would be useful in airports, terminals, amusement parks, simulators, museums, trade shows, exhibits, and the like. With the proliferation of handheld and notebook computers, additional opportunities exist for LSDs to interact—not only with viewers, but also with the viewers' personal computing devices.

U.S. Pat. No. 5,455,882 discloses an interactive, thin, optically-based apparatus which is designed for interaction with a remote control device such as an infrared remote control unit. This display is comprised of laminar waveguides that are driven by one or more lasers, modulated by a video signal, that scan each waveguide. The display is not modular in nature, and the nature of the interactive capabilities is not relevant for large screen applications. Scanning and light detection are done remotely on a separate substrate from the display waveguides. This invention does not describe a software component that controls the visual feedback on the display in response to the nature (e.g., duration or position) of the interactive initiative.

U.S. Pat. No. 5,127,078 discloses an apparatus for the simultaneous viewing and receiving of images, transferred through a system of interconnected fiber optic faceplates. The sending and receiving fibers are integrated and unnoticeable, and the device is designed to simultaneously display and view images. Because of this, it uses a high density of very tightly packed small diameter fibers. This has several undesirable effects for inexpensive outdoor displays, namely high cost, low contrast, and increased weight. Moreover, the display is used in 1:1 configuration such that no enlargement is made of the input image.

U.S. Pat. No. 5,953,469 discloses an optical display comprised of a matrix of optical waveguides and mechanical light switches. Like fiber optic displays, this invention possesses intrinsic interactive capabilities. However, because the apparatus is constructed from sandwiched layers of glass (or plastic) and various conductive and dielectric layers, the invention is not well suited to the demands of being placed in direct pedestrian contact, not is it suited to great thermal extremes. Since the light switches are operated electrostatically, the display is susceptible to shock. Also, the efficient operation of the display requires that it be hermetically sealed, indicating that it is not a particularly robust technology. Lastly, the device is driven, most efficiently, from LEDs. Because of the manner in which the LEDs are coupled to the waveguides, sufficient luminous flux levels for high ambient lighting conditions cannot be currently achieved.

SUMMARY OF THE INVENTION

The invention here disclosed is a novel solution to many of the limitations of the prior art. A preferred embodiment of the invention includes a modular electro-optic video display assembled from inexpensive, plastic tiles. The tiles may employ fiber optics or solid plastic lightguides to convey images from a first, or projection surface, to a second, or display surface where the image is enlarged. A description of such an apparatus has been disclosed in U.S. patent application Ser. No. 09/569,811, now allowed, and U.S. patent application Ser. No. 09/482,290, now U.S. Pat. No. 6,304,703.

In the preferred embodiment of the present invention, each display tile is populated with additional optical fibers or lightguides which are collected into a third, or input, surface for the purpose of detecting electromagnetic radiation, preferably in the 200–1300 nm band, which corresponds to UV, visible, and infrared light. This light collection and detection provides a means of interaction with the display, whether personally or through handheld computing devices or cellular ("wireless") telephones. Preferably, the light detection circuitry is coupled to the same computer that drives the display, thereby constituting a feedback loop. Because the preferred display tiles are made from thermoplastic and composite materials, they are durable and able to withstand the abuses of an interactive environment. Unlike CRT-based touch sensitive screens, which employ a capacitive film, a preferred embodiment of the present invention employs an optically-coupled, computer-controlled sensor array which senses not only position, but also movement (velocity), attack (acceleration), patterns, and timing.

BRIEF DESCRIPTION OF THE DRAWINGS

FIG. 2 shows five views of a specific embodiment of the invention—front (FIG. 2A); side cross-sections at two locations (cut-away) (FIGS. 2B, 2C); and rear perspective view (FIG. 2D).

DETAILED DESCRIPTION OF THE INVENTION

Figure 1:
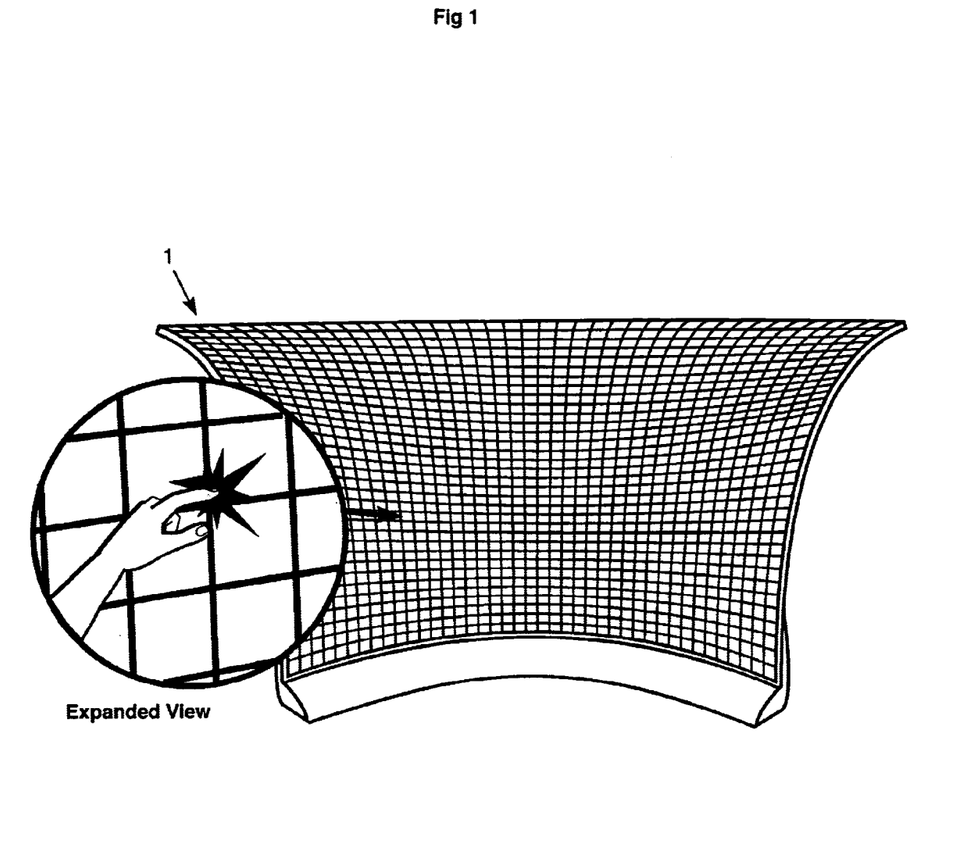
FIG. 1 depicts an example of a contoured interactive large screen display.
Figure 2A:
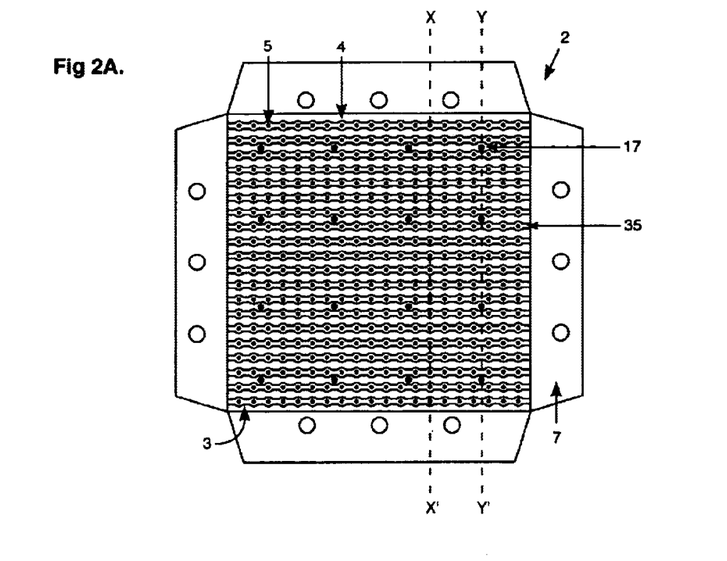
Figure 2B:
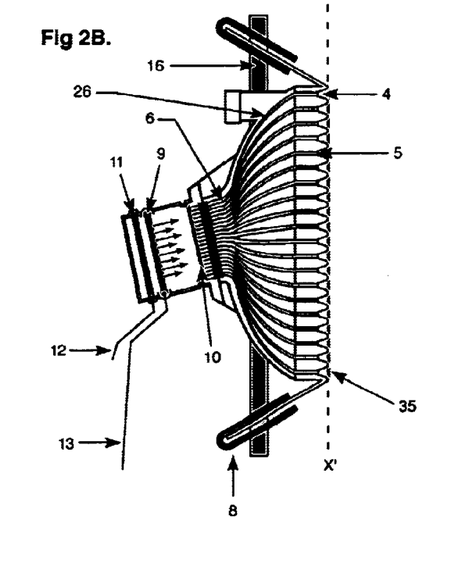
Figure 2C:
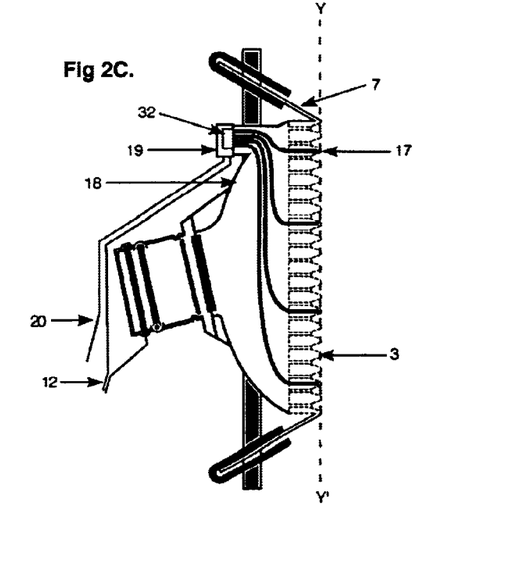
Figure 2D:
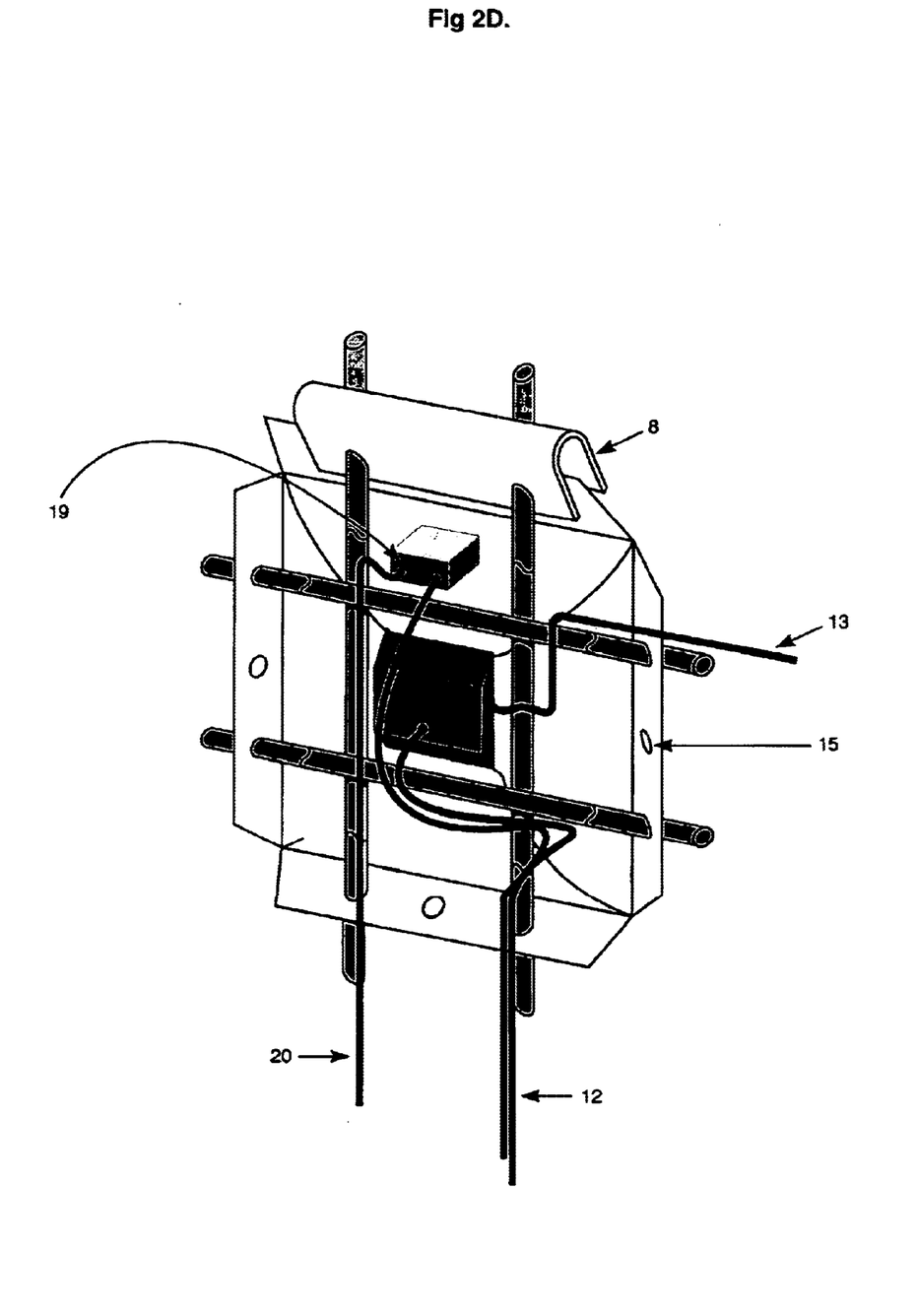

A preferred embodiment of the invention includes a planar or contoured large screen display (LSD) 1 as it may be viewed in FIG. 1, comprised of a matrix or array of tiles 2. Each LSD 1 includes a plurality of (preferably) equal-sized tiles 2 adjoined to each other and to a structural frame 14, in rows and columns, and supported by flexible support rods 16. In the preferred embodiment, as may be viewed in FIG. 3A, each tile 2 has its own micro-display 9 and illumination device 11 coupled to the rear of the tile 2 for producing an image on the surface of the tile 2, said image being a partial image of the total displayed image. Alternatively, each tile 2 may be coupled via an ordered imaging bundle of optical fibers 6 to a single data/video projector 31, as may be reviewed in FIG. 3B FIGS. 2A–2E are referred to in the following description of the display tiles 2. Each display tile 2 is assembled from parts made of injection-molded plastic, typically ABS, polycarbonate, or some other material appropriate to the environmental conditions in which the LSD 1 will be deployed. The overall LSD 1 is designed to be either planar or contourable, the size of each tile 2 being small enough to allow the radius of curvature required to contour the LSD 1 in the desired fashion, with smaller tiles 2 allowing a smaller radius (greater curvature). In the preferred embodiment, each display tile 2 is comprised of two separate parts: a front piece which constitutes the display surface 3 and a rear cowl 18, which are snapped and cemented together after the fibers 26 are inserted into the front piece. The display surface 3 of each tile 2 is preferably perforated by a matrix of concave, conical orifices 4 in which the distal fiber optic ends 5 terminate as may be viewed in FIGS. 2A and 2B. The half-angle of the cone should correspond to the numerical aperture (NA) of the fiber 26 used, such that the cone of light emitted from each distal fiber end 5 is not occluded or limited. The fiber optic strands 26 are preferably collected into an ordered square input bundle 6 which terminates at the rear of the tile 2 as shown in FIGS. 2B and 2C. The input bundle also may be rectangular, if the tile 2 is rectangular. The surface comprised of all the fiber terminations is then polished and optically coated for optimal image coupling. The tile 2 assembly may be filled with expanding foam that serves both to insulate and protect the fiber optic strands 26 enveloped therein.

On the surface 3 of the display, the fiber terminals 5 are preferably located so that they are slightly recessed with respect to the tile surface 3 as illustrated in FIG. 2B, and are affixed with optical epoxy (e.g., EpoTek 301). A light-shaping diffusion film, preferably a holographic diffusion film 35 with very high optical transmission and low back-scattering, is then applied to the front (or display surface) 3 of each tile 2. Preferably, the diffusion film 35 is affixed in such a manner as to leave between 30–70% of the tile surface exposed, as illustrated in FIG. 2A. The percentage of exposed tile surface 3 is related to the contrast of the display 1 and is dictated by the lighting conditions in which the display 1 will be used. Displays 1 for indoor use can be depixelized more than displays 1 to be used outdoors. The base material chosen for the tile 2 is preferably black, with a matte or lenticular stippled surface in order to enhance the contrast of the display by absorbing ambient light. Alternatively, a translucent or light-diffusing material may be used for the base material. In this case, black, light-absorbing material may be attached or silk-screened onto the tile surface 3 to achieve the same effect as illustrated in FIG. 2A.

The pitch or spacing between adjacent distal fiber ends 5 is also determined by the application, so that LSDs 1 to be used for proximal viewing (e.g., indoors) will have a higher fiber density (smaller pitch) than LSDs 1 used for viewing at a distance. In the preferred embodiment, the display surface 3 is designed with a matrix of orifices 4 spaced 4 mm on center, so that pixel pitches in multiples of 4 mm may be used (e.g., 4 mm, 8 mm, 12 mm, 16 mm, etc.). The preferred embodiment uses a uniform 8 mm center—center pitch on both the vertical and horizontal axes. Preferably, the distal fiber ends 5 on the perimeter of the tile 2 are situated half of the pixel pitch, or 4 mm, from the tile edge, so that when multiple tiles 2 are joined, the 8 mm fiber pitch is preserved.

Figure 2E:
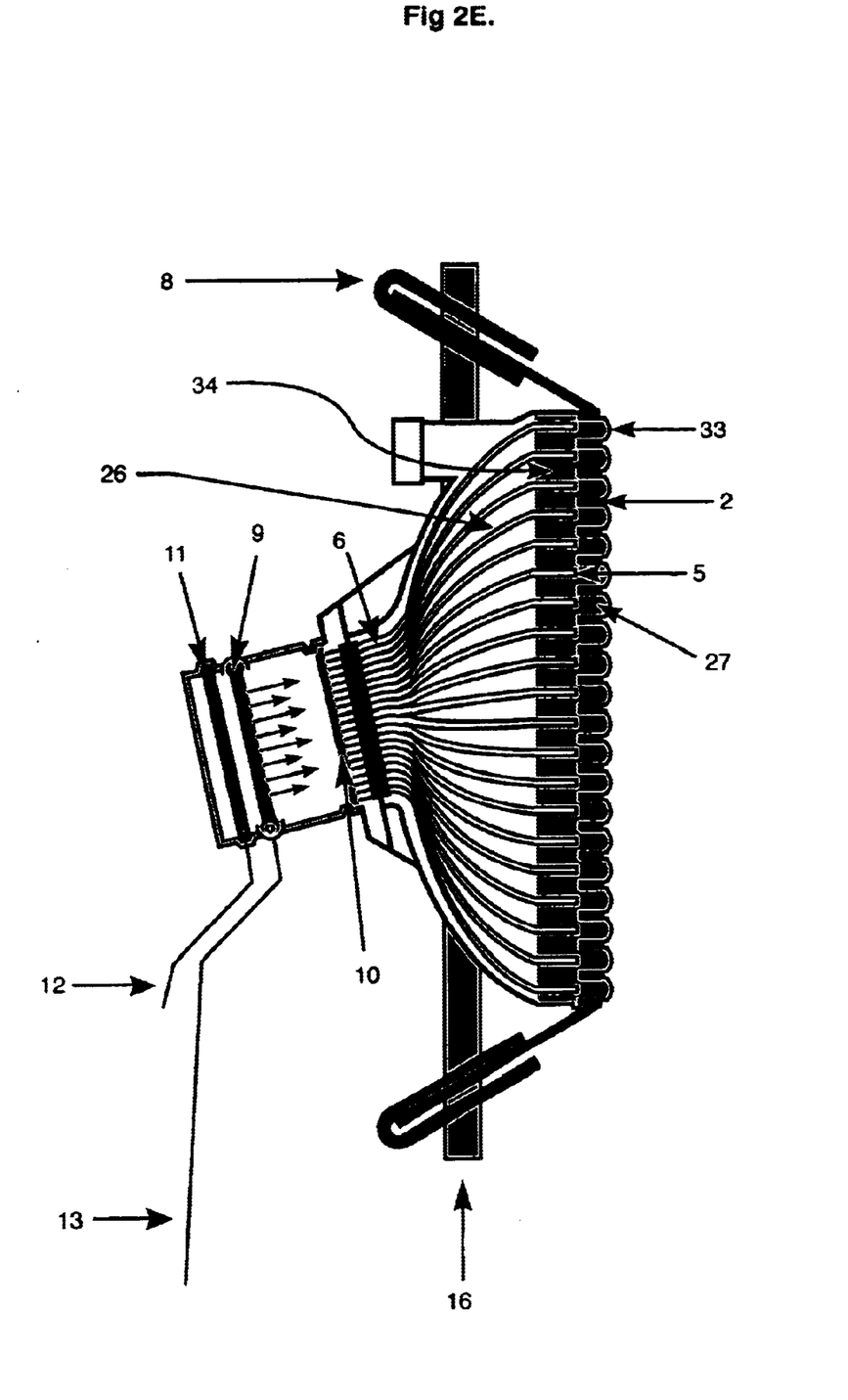
FIG. 2E illustrates a second embodiment of the invention employing solid plastic light guides at the display surface.

In an alternative and preferred embodiment of the present invention, the optical fiber assembly is partially replaced by a solid transparent thermoplastic (e.g., polycarbonate, or acrylic) array of optical lightguides 27 to which an array of optical fibers 26 is attached, as illustrated in FIG. 2E. Preferably, the lightguides 27 are attached directly to the display tiles 2 and function as both lightguides and lenses, having several advantages over direct termination of the fibers 26 near the display surface 3. First, because the lightguides 27 may be manufactured using an injection-molding procedure, the entire lightguide array can be made as a single part and the optical fibers 26 can be held in a fiber carrier 34 which attaches to the lightguide 27 as a single unit, eliminating the time and expense of inserting individual fiber ends 5 into the display tile 2. Second, because of the manufacturing procedure involved, the thermoplastic light-guides 27 can be tapered or molded to any desired shape, thus enhancing the contrast ratio and overall appearance of the LSD 1. Formation of such tapered ends on optical fibers is a costly process. Each solid lightguide array may have a lens or diffuser 33 formed on each distal end, for the purpose of providing wide-angle viewing of the LSD 1. These lenses 33 can be formed by molding, embossing, or lithographically etching the material.

In this embodiment, each tile 2 may be fitted with tabs 7 along each of its four sides as shown in FIG. 2A (edge tiles may have only three tabs, and corner tiles only two tabs). The tabs 7 may be molded as appendages to each tile 2, or may be manufactured as separate items and attached to each tile 2 using hardware or adhesive; in either case they must somewhat flexible to allow for curvature of the display surface 3.

Each tile 2 is joined to its four (or two or three in the case of corners or edges) neighboring tiles 2 by means of clips 8 which are inserted around and over adjacent tabs 7. Alternatively, several different clip widths can be made which force the adjoining tiles 2 to be disposed at specific angles, although the curvature of the display surface 3 is determined primarily by the tile support and locator rods 16.

In this embodiment, mounted to each tile input surface is a micro-display 9—a miniature spatial light modulator (SLM), commonly available as a commercial off-the-shelf product, as illustrated in FIG. 2B. Each SLM requires a source of illumination 11, low voltage input power to the illuminator 12, and low voltage electrical signal power 13. In addition, a polarizer is generally required between the illumination source 11 and the SLM 9, as well as a diffuser to assure uniform illumination of the SLM. Various options are available for illumination, depending upon the type of SLM used. Ferro-Liquid Crystal Displays (FLCDs, e.g., from Display Tech), are field sequential displays, meaning that red, green, and blue light are sequentially strobed by the display electronics into the SLM. This can be achieved using arrays of high-brightness LEDs, which are readily available off-the-shelf. SLMs such as active matrix TFTs (Thin Film Transistors) require collimated white light. This can be achieved with Cold Cathode Fluorescent (CCF) technology, full spectrum LED arrays, arc lamps, etc. For outdoor use, the SLMs must be able to handle large amounts of luminous flux. Thus, transmissive SLMs with large aperture ratios or highly efficient reflective SLMs (e.g., LcoS displays from Spatial Light) are preferable. A refractive microlens array (RMLA) 10 may be used to enhance the optical coupling between the light from the SLM 9 and the optical fiber array 6.

The image signal for each SLM is a segment of the input signal to the display electronics. A computer image or other source image is divided by the number of tiles 2 comprising the LSD 1. Standard off-the-shelf video wall processors constitute the electronic circuit 22 for segmenting images among the micro-displays 9. The image source and video splitter 22 are preferably disposed in a separate enclosure.

Figure 3A:
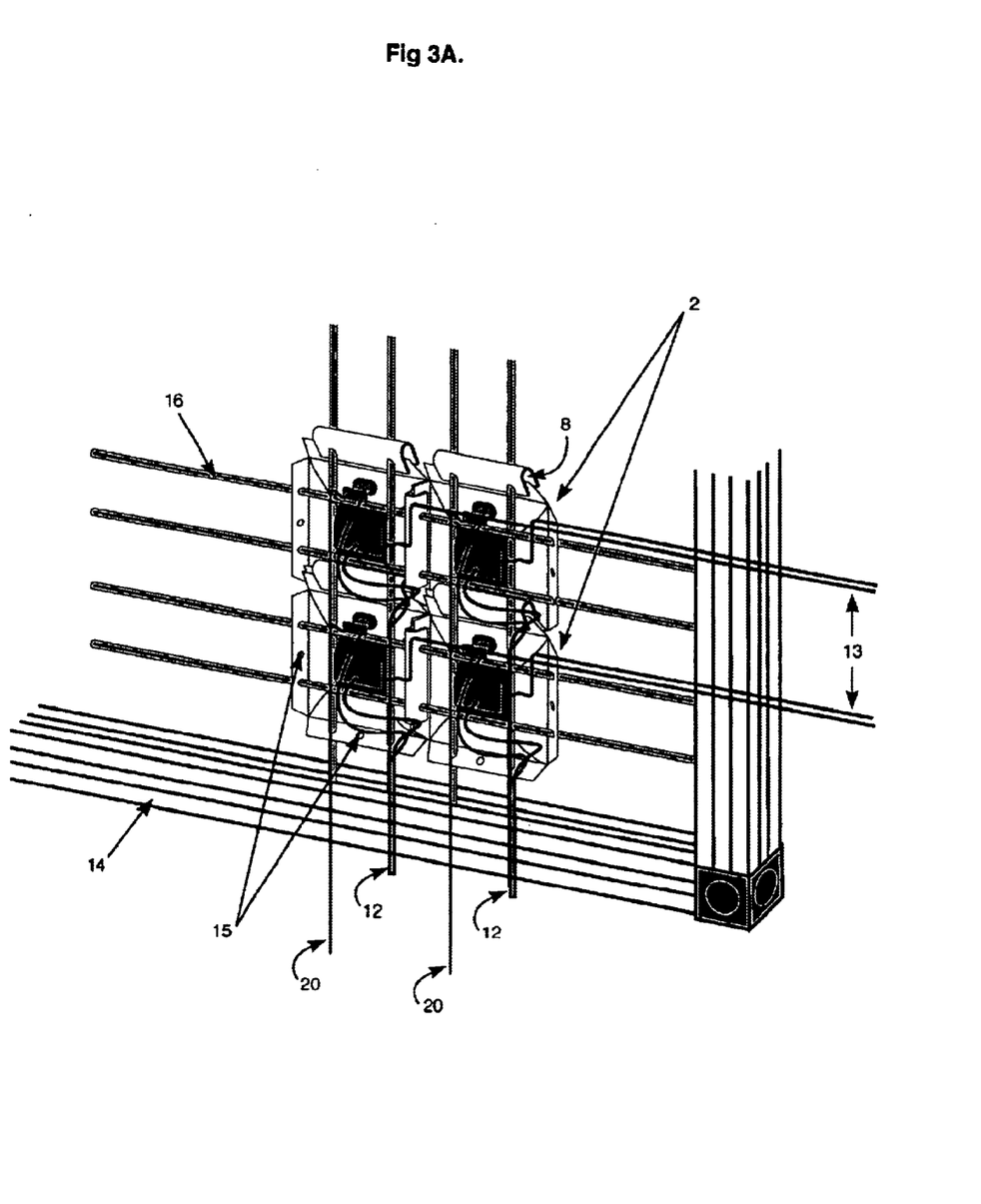
FIG. 3A is a rear perspective view demonstrating how multiple tiles may be joined to form a display driven by a plurality of micro-displays.
Figure 3B:
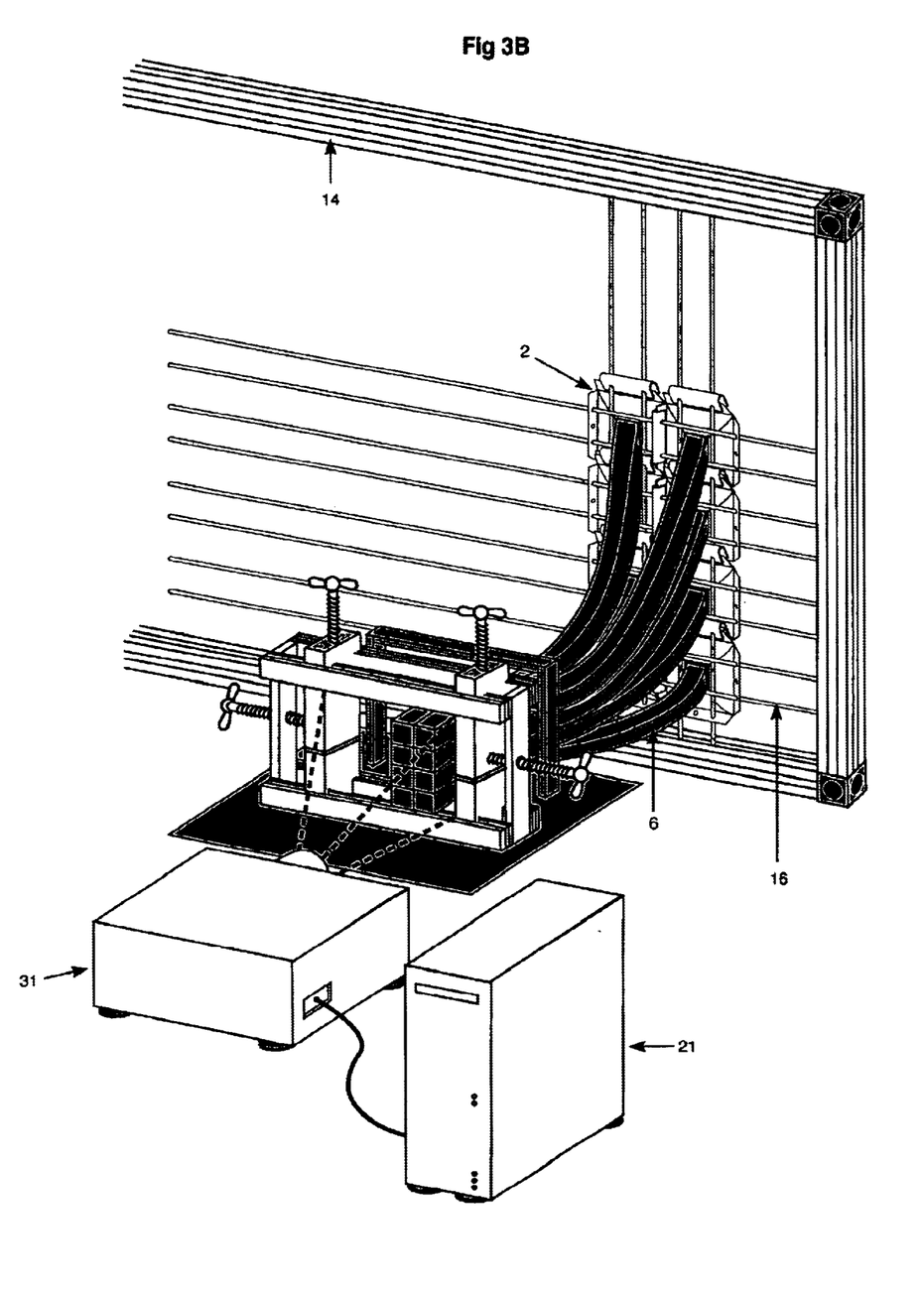
FIG. 3B is a rear perspective view demonstrating how multiple tiles may be joined to form a display driven from a single projector.

A structural frame 14 may be used in non-permanent applications as may be viewed in FIG. 3A. Such a frame 14 may be constructed of extruded or tubular aluminum, plastic, or other suitable material. Each display tile 2 is fitted with vertical and horizontal locator passages 15 through which flexible locator rods 16 pass. Alternatively, the locator passages can be formed into the clips 8 that are used to attach adjoining tiles 2 as shown in FIGS. 2B, 2C, 2D, and 3A. The locator rods 16 can then be attached to the top, bottom, and two sides of the structural frame 14 as illustrated in FIG. 3A.

Because of the nature of fiber optic LSDs, a significant portion of the display surface area 3 of each tile 2 is not populated by output fibers, leaving ample room for optical input fibers 17 as shown in FIG. 2A. Optical input fiber 17 materials are selected based on their optical transmission characteristics in the wavelength region which the interactive display system has been designed to collect. For example, if the visible spectrum is being collected, then inexpensive plastic optic fiber (PMMA) can be used. Quartz or fused silica fibers may be required for use where ultraviolet or infrared radiation is being detected. Solid acrylic and polycarbonate may also be used. The density and pattern of optical input fibers 17 on the display surface 3 is a function of the use of the LSD 1. Imaging applications using a CCD (Charge-Coupled Device) will require a high input density, whereas simple light detection can use a low density.

There are numerous methods for opto-electrical coupling that can be employed, depending upon the specific use of the LSD 1. Inexpensive cadmium sulfide (CdS) photoresistors can be coupled to the input to detect the amount of light impinging upon the tile 2. This type of coupling is the least expensive as well as the least sensitive, and does not require that the input fibers 17 are formed into an ordered (imaging) array. If greater sensitivity is required, photodiode arrays can be employed, where each photodiode can be individually coupled to a single input fiber 17. If imaging is required, an ordered fiber array can be coupled to a CCD. COTS infrared transceivers can be coupled to quartz fibers. These transceivers can be directly connected to the serial inputs of a computer or network interface for sending and receiving infrared signals, for the purpose of controlling information exchange (e.g., using the IrDA standard).

The preferred embodiment disclosed uses sixteen optical input fibers 17 per 6-inch square tile 2. Preferably, these are configured in a 4×4 array or matrix as shown in FIG. 2A. PMMA (acrylic) optical fiber of 1 mm diameter is used. Each row of four fibers is coupled to a sensor, preferably a single monolithic quad-phototransistor IC 32, and in the example disclosed four rows of fibers together comprise an interactive input surface coincident with the surface 3 of the display tile 2. The four outputs are then coupled to an off-the-shelf integrating circuit which effectively superimposes the voltage outputs from the phototransistor IC's. Thus, each tile 2 has a singular time-varying voltage output signal 20 that corresponds to the integrated light output from the surface of the tile 2. Preferably, this circuitry is housed in an enclosure 19 that is connected to or integrated with the tile's rear cowl 18.

Figure 4:
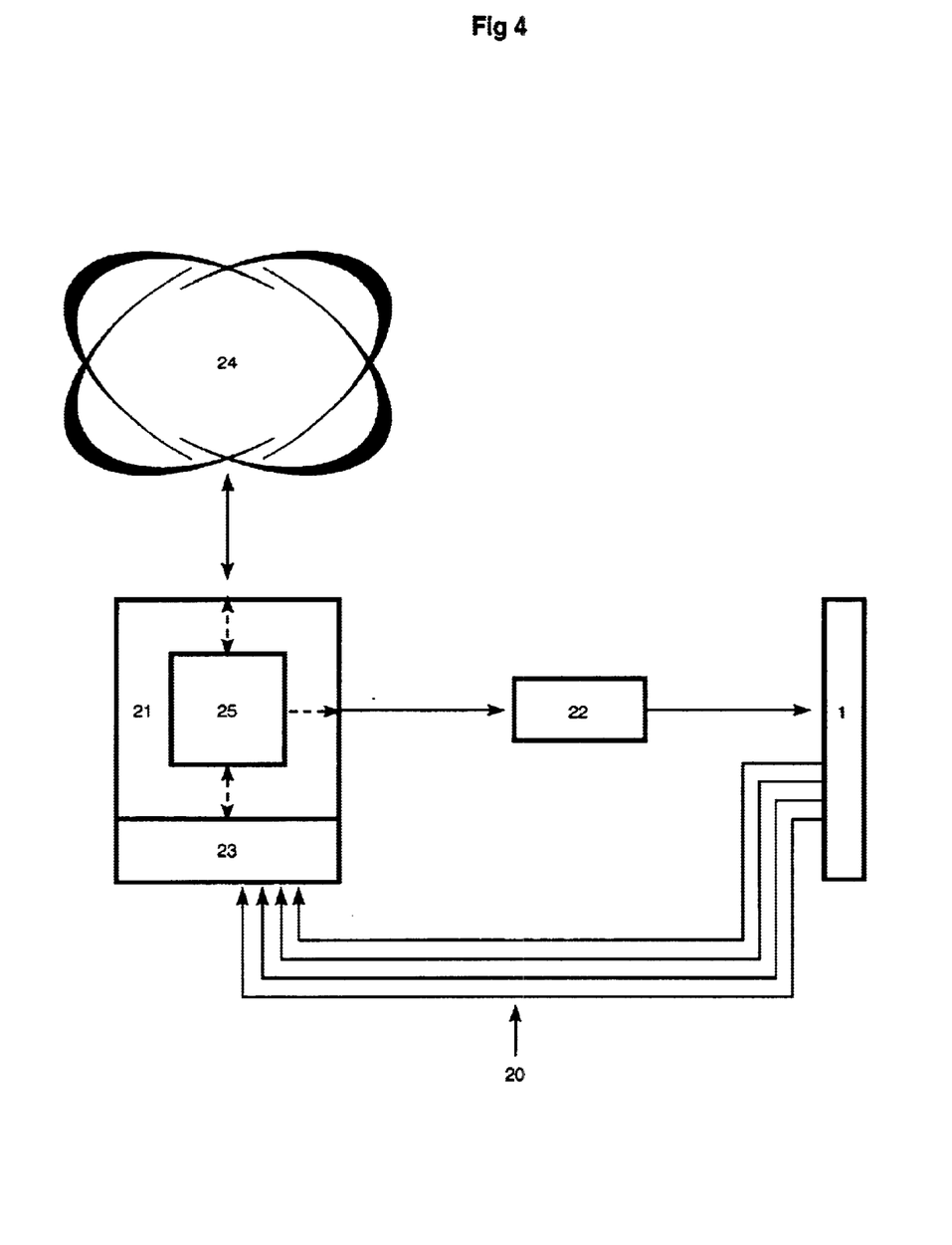
FIG. 4 is a block diagram identifying various components of a preferred embodiment of the invention.
Figure 5:
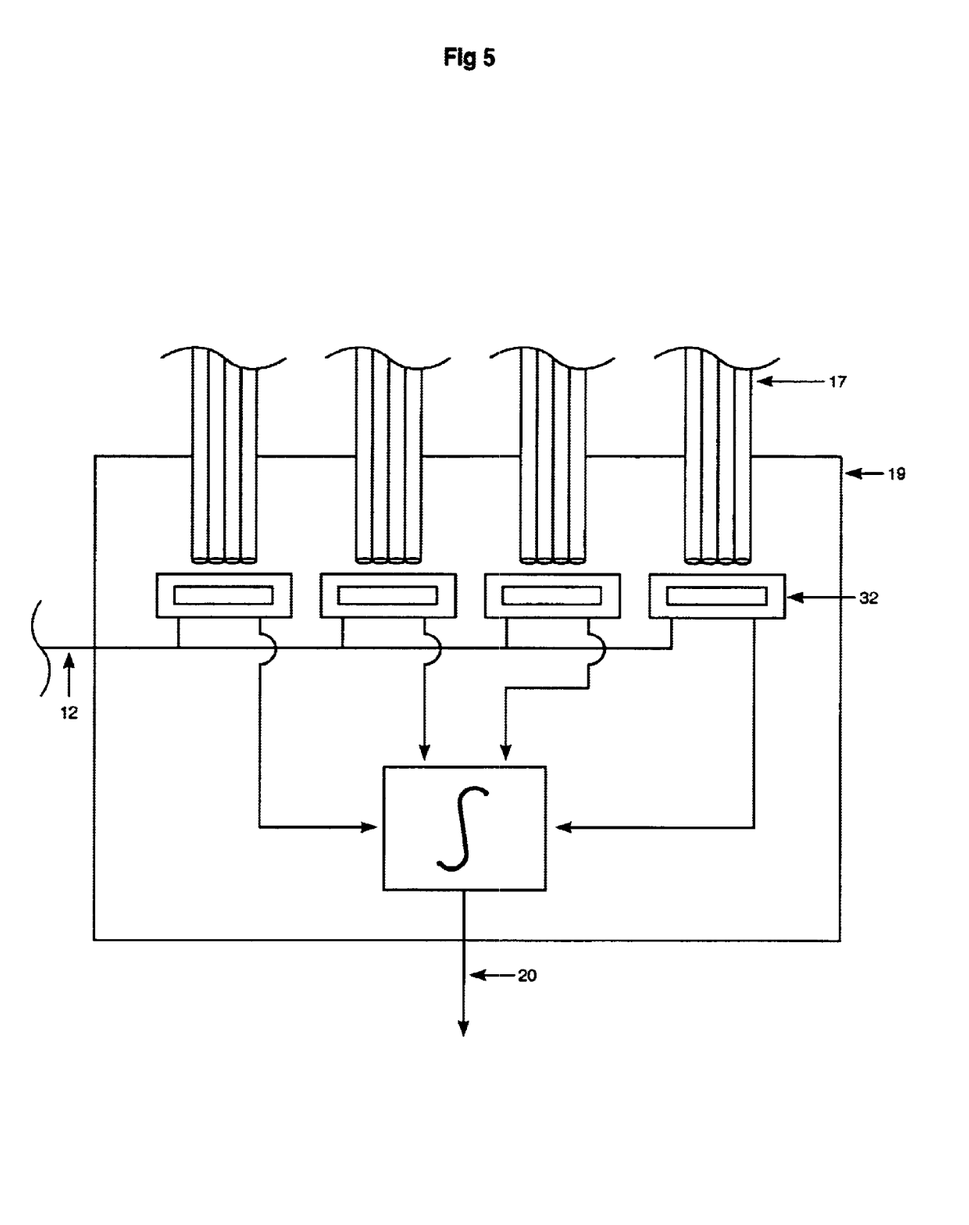
FIG. 5 is a block diagram of an opto-electrical transducer circuit.

The following discussion refers to FIG. 4. The low voltage outputs 20 from the collective matrix of display tiles 2 are connected to a data acquisition card 23 hosted by the computer 21 that is driving the LSD 1. Preferably, this data acquisition card 23 is capable of sampling several hundred analog input lines. "Intelligent" data acquisition cards (i.e., cards that are designed with onboard CPU's and RAM for data buffering) are preferable since they permit the host computer 21 to drive the display without the additional overhead of analyzing and responding to the input data stream.

A software application is executed on the processor built into the intelligent data acquisition card 23. This application samples the analog inputs at the desired frequency. The sampling frequency is determined by the LSD application. For example, to sense human interaction, a frequency of 4–20 Hz would generally be sufficient. In order to detect a hockey puck striking the LSD, per our previous example, we would need to sample at 10–100 Hz per channel. This per-channel rate is then multiplied by the number of display tiles 2 to arrive at an aggregate sampling frequency. Sampled data need not be saved; again, it is contingent upon the use of the LSD 1. If only real-time responses are generated, then data storage is not necessary. The interactive signal information from the tiles can be characterized as follows:

Position—That is, which tile 2 or tiles 2 have been activated.

Light/dark—The circuitry can be designed to detect either the absence of light or the presence of light.

By differentiating the input signal, a measurement of the velocity of an object towards (or away from) the LSD 1 can be made; and by differentiating the velocity signal the acceleration of an object towards (or away from) the LSD 1 can be determined.

Pattern—The pattern created by the activation/deactivation of specific tiles 2 can be used to determine the size and shape of persons or objects in proximity to the display surface 3.

Sequences—The sequence in which tiles 2 are activated/deactivated; this information can also be used to determine the velocity and acceleration of the person or object near the LSD 1.

Depending upon the LSD 1 application, one or more of the above characteristics can be extracted from the interactive data. The data acquisition executive software then generates an interrupt to the host computer 21 indicating that some type of event requiring a response has occurred. The host computer 21 then alters or augments the display via a separate software application 25. Typical latencies for this interactive cycle are on the order of 10 to 250 milliseconds. The entire interactive display system can be connected to a network 24, (e.g., the public internet) for the purpose of remote or unattended control.

In addition to the examples above, other uses for this invention include:

Security—A combination of infrared, visible light, and imaging sensors to provide personnel access to secure areas. Entrance would be gained by creating "keys" that are activated by touching or occluding ambient light from certain tiles 2 in a certain pattern, with a prescribed timing sequence.

Interactive dance floor—A dance floor comprised of interactive tiles 2 would respond to the position and movement of dancers. Software on the controlling computer would then change the lighting or imagery. This would be useful for dance instruction.

Interactive walkway or hallway—In a similar manner the floor, walls, and/or ceilings of walkways or hallways could be assembled from interactive display tiles 2, with software on the controlling computer 21 changing the lighting or imagery in response to the position and movement of users. Alternatively, a user, upon entering the walkway, could choose from a displayed menu of colors, textures, shapes, etc. which the control computer 21 would subsequently execute as the user moves along the walkway.

Interactive task-specific lighting—Allows control of lighting parameters (color, luminance, etc.) by simply touching different parts of the LSD 1 or a single tile 2. Since the light source is remote from the display surface 3 there is no heat at the surface. This would be useful in medical and dental offices, operating rooms, machine shops, and the like. An interactive display and illumination system would also be useful for optometrists and ophthalmologists, by combining lighting and optical testing (e.g., letter and color charts, depth perception, and peripheral and binocular vision tests). The same type of lighting would be useful in behavioral science laboratories and clinics.

Interactive opportunities exist particularly in the retail segment. For example, an interactive LSD could display an advertisement and simultaneously offer downloadable "coupons" (or vouchers) to passersby on their personal digital assistants (PDAS) or cellular phones by employing infrared or wireless communication modes. A second example is the use of interactive video displays in sports venues, such as in a hockey arena along the dasher boards. Such a display could "respond" in real time to the proximity, impact, or relative motion of the players, sticks, or puck to the boards, as well as display advertisements.

Another example related to sports is the use of a rugged interactive display as a basketball backboard. In this example, the interactive capabilities could be used to respond when the basketball hits the backboard, as well as to display advertisements and the score.

Another type of application for interactive video displays is the area of interactive gaming, in which participants armed with laser or other light-emitting "weapons" engage in virtual adventures (e.g., combat, exploration, board games, etc.) within a physical area in which the walls, ceiling, and even the floor consist of interactive LSDs, such LSDs operating under the control and management of a computer which, by means of the interactive capabilities of each LSD, "knows" the location and movement of each participant, and adjusts or manages the game parameters and the video content delivered to each LSD accordingly. The LSDs in this case are sensitive not only to the proximity and movement of each participant, but also to the discharge of light-emitting "weapons" carried by the participants, generating visual feedback on the displays in response to the nature (e.g., duration, position, or intensity) of the interaction with the game participants.

I claim:
1. A display device, comprising:
a display surface;
a plurality of electronic devices for sensing variations in luminous flux; and
a plurality of optical fibers for optically communicating from the display surface to the electronic devices and transmitting to the electronic devices variations in luminous flux resulting from the presence of persons or objects spatially positioned proximately before the display surface.

2. The display device of claim 1 wherein each of the electronic devices is a light sensitive device.

3. The display device of claim 1 wherein each of the electronic devices is a transducer.

4. The display device of claim 1 wherein each of the electronic devices produces an output relating to sensed luminous flux.

5. The display device of claim 4 wherein the output further relates to at least one variation in sensed luminous flux.

6. The display device of claim 1 wherein there is a correspondence between the optical fibers and the electronic devices so that each operative electronic device optically communicates with at least one optical fiber.

7. The display device of claim 1 wherein the variations in luminous flux comprise temporal and/or spatial variations.

8. The display device of claim 1 wherein the display surface is comprised of a plurality of tiles.

9. The display device of claim 8 further comprising:
a plurality of micro-displays; and
at least one light guide between each operative micro-display and a corresponding one of the tiles;
wherein each light guide can transmit an image segment from its corresponding micro-display to its corresponding tile.

10. The display device of claim 9 wherein each light guide is an optical fiber.

11. The display device of claim 9 further comprising an image segmenter that can separate an image into a plurality of image segments for delivery by the plurality of micro-displays to the plurality of tiles through the light guides.

12. The display device of claim 11 further comprising a computer that can receive inputs from the electronic devices, and which is programmed to control content of the image segments in response to the inputs from the electronic devices.

13. The display device of claim 8, further comprising:
an optical image projector; and
a plurality of light guides between the optical image projector and the tiles;
wherein the light guides can transmit an image from the optical image projector to the tiles.

14. The display device of claim 13, wherein:
the optical image projector may project static images and/or dynamic videos and
each light guide is an optical fiber.

15. The display device of claim 9 wherein all light guides corresponding to a single micro display are bundled to terminate at the corresponding tile at a polished and coated surface.

16. The display device of claim 15 wherein each coated surface comprises a diffusion film.

17. The display device of claim 9 wherein each light guide corresponding to a single micro display comprises an array of solid light guides to which an array of optical fibers is attached.

18. The display of claim 8 further comprising a spatial light modulator corresponding to each operative tile.

19. An interactive large screen display, comprising:
   a display surface comprising a plurality of tiles;
   an optical image projector;
   a plurality of light guides between the optical image projector and the tiles, wherein each light guide transmits an image segment from the optical image projector to the display surface;
   a plurality of electronic sensing devices for sensing variations in luminous flux; and
   a plurality of optical fibers for optically communicating, from the display surface to the electronic sensing devices, variations in luminous flux resulting from the presence of persons or objects spatially positioned proximately before the display surface.

20. The display of claim 19, further comprising:
   a data acquisition device that receives, from the electronic sensing devices, signals corresponding to variations in sensed luminous flux; and
   a computing device programmed to receive data from the data acquisition device and change at least one image segment based on the sensed luminous flux.

21. An interactive large screen display, comprising:
   a means for transmitting an image or video to a display surface via a first set of optic fibers;
   a means for detecting, via a second set of optic fibers, variations in luminous flux resulting from the presence of persons or objects spatially positioned proximately before the display surface; and
   a means for modifying at least a portion of the image or video based on detected variations in luminous flux.

* * * * *